United States Patent [19]
Reilly

[11] 3,907,476
[45] Sept. 23, 1975

[54] APPARATUS FOR FINISHING HOLLOW PLASTIC ARTICLES

[75] Inventor: Joseph R. Reilly, Naugatuck, Conn.

[73] Assignee: Monsanto Company, St. Louis, Mo.

[22] Filed: Dec. 26, 1972

[21] Appl. No.: 318,460

Related U.S. Application Data

[63] Continuation-in-part of Ser. No. 120,514, March 3, 1971, Pat. No. 3,736,091.

[52] U.S. Cl..... 425/305 B; 425/403; 425/DIG. 203; 425/DIG. 212
[51] Int. Cl.² ................... B29C 17/00; B29C 17/08
[58] Field of Search ............ 425/305, 305 B, 326 B, 425/324 B, 302 B, DIG. 203, DIG. 204, DIG. 212, DIG. 216, 267, 392, 393, 403; 264/312; 83/914; 408/150

[56] References Cited
UNITED STATES PATENTS

| | | | |
|---|---|---|---|
| 2,450,437 | 10/1948 | Miller | 264/312 X |
| 2,988,776 | 6/1961 | Schaich | 264/99 |
| 2,994,103 | 8/1961 | Schaich | 264/99 |
| 3,272,896 | 9/1966 | Winchester | 425/DIG. 204 X |
| 3,303,249 | 2/1967 | Strauss | 425/392 X |
| 3,387,347 | 6/1968 | John | 264/312 X |
| 3,466,702 | 9/1969 | Stenger | 425/215 |
| 3,510,915 | 5/1970 | Johansson | 425/245 X |
| 3,657,406 | 4/1972 | Delebarre | 425/305 B X |
| 3,711,233 | 1/1973 | Uhlig | 425/326 B X |
| 3,723,043 | 3/1973 | Leopold et al. | 425/393 |

Primary Examiner—Francis S. Husar
Assistant Examiner—Carl Rowold
Attorney, Agent, or Firm—Michael J. Murphy

[57] ABSTRACT

In finishing hollow plastic articles having waste flash attached to a neck portion by severing the flash from the neck at a pliable joint area between the two and then forcing an irregular lip left at the area of severence inwardly of the neck, improvements are provided which involve rolling a finishing tool around the inside of the neck in contact with the inwardly displaced lip while exerting a radially outward force thereon to positively compress the lip into the neck wall. The apparatus includes means for moving the lip contacting surface of the finishing tool eccentrically to the neck axis, means for rolling the eccentrically moved surface around the inside of the neck, the finishing tool preferably being mounted for rotation about its own axis during such rolling. Insulation means may be optionally provided in the blow mold where the article is formed to facilitate keeping the plastic in the joint area between the neck and flash at elevated temperature until the flash can be severed thereat.

11 Claims, 9 Drawing Figures

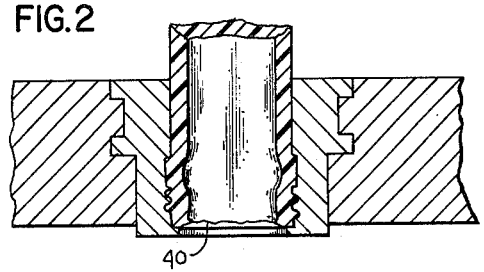
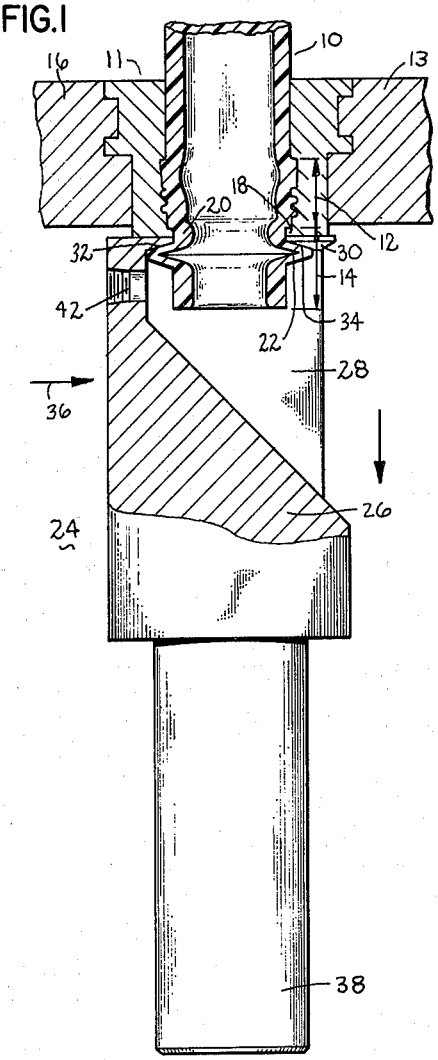
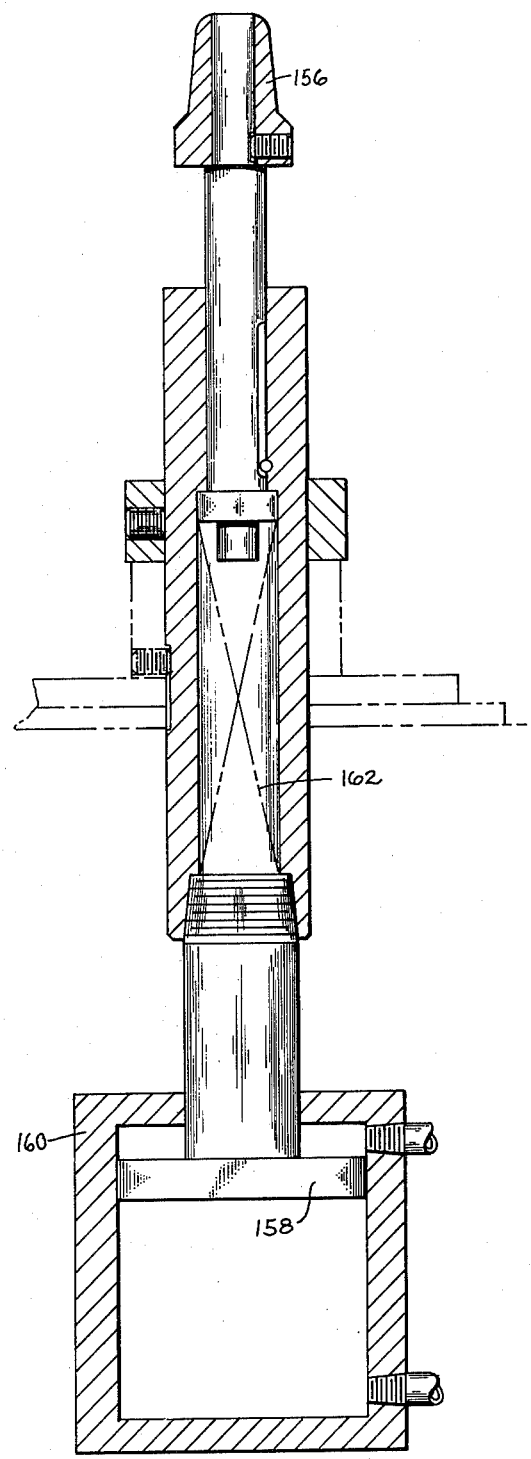

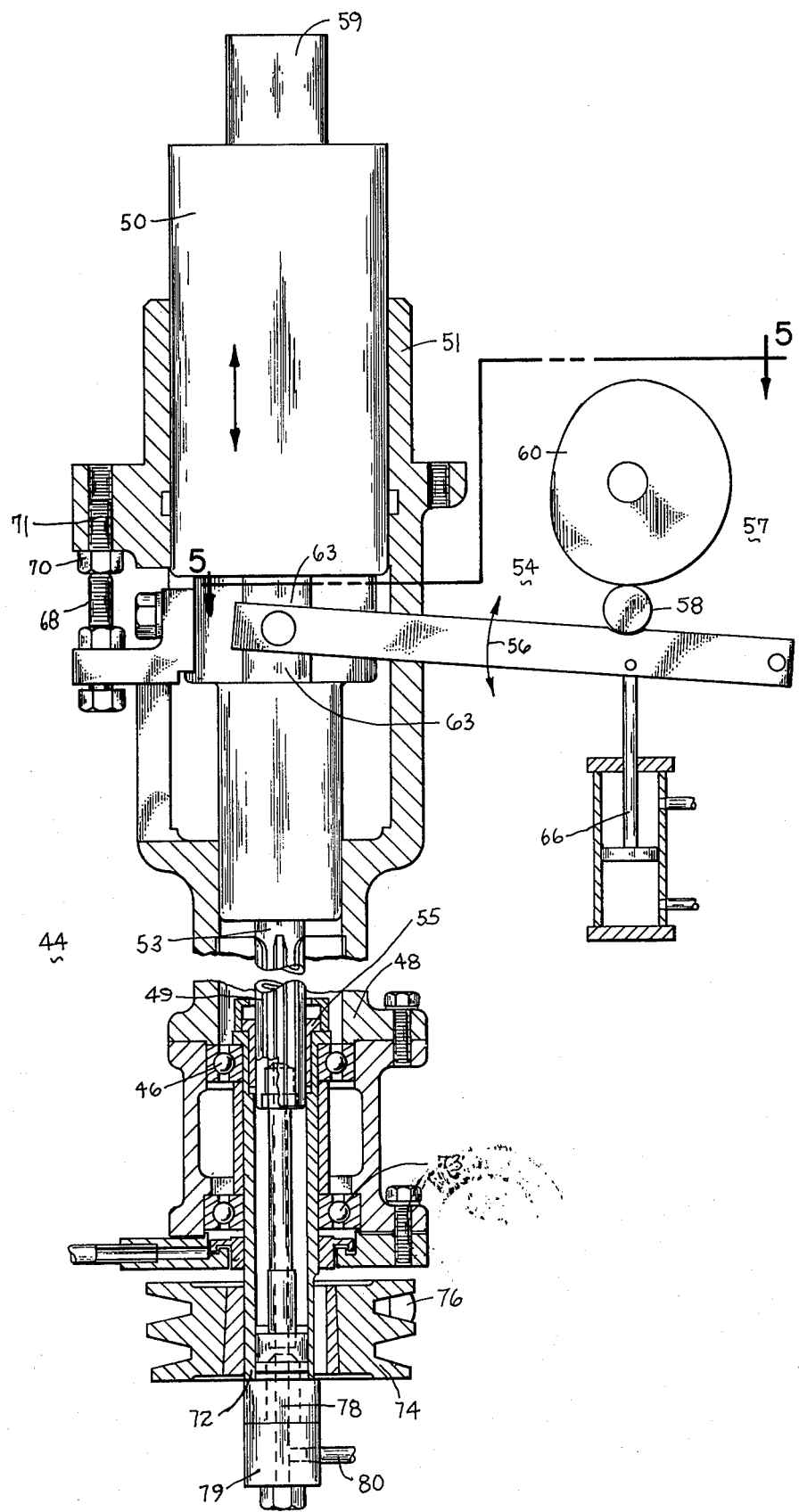

APPARATUS FOR FINISHING HOLLOW PLASTIC ARTICLES

BACKGROUND OF THE INVENTION

This application is a continuation-in-part of copending Application Ser. No. 120,514, filed Mar. 3, 1971.

This invention relates to finishing blown hollow articles and more particularly to improvements in forming smooth surfaces on the open ends of such articles subsequent to ejection from the forming mold.

In commonly assigned copending U.S. Application Ser. No. 120,514, filed Mar. 3, 1971, there is disclosed a technique of finishing hollow blow molded plastic articles either while still in the mold or at a separate downstream station. A waste flash appendage is pulled away from the neck and an irregular, slightly protruding lip left in the area of severance is then displaced back into the neck with a contoured plug to provide a relatively smooth finish. Severance is at a thickened section opposite a shelf in the mold defining the upper surface of the neck and the temperature of the plastic in such area of severance is rather carefully controlled to insure that the irregular lip is still sufficiently pliable to permit inward displacement after pulling the flash off. This technique has the substantial advantage of eliminating the need for high speed rotating cutting and reaming tools for finishing, such tools being prone to wear excessively and to crack the neck especially when the plastic is relatively hard and brittle. Though, as mentioned, it is possible to carry out this technique while the article is in the mold, performing it downstream of the mold avoids extending the molding cycle by the time increment necessary for finishing.

The aforesaid technique yields a finish which is satisfactory on certain articles but is marginal for more critical applications where the end of the molded article defines an opening through which a consumable product such as a beverage will be emitted. More specifically, it has been found that the plastic forced inwardly by the plug is often not completely molded into the wall of the neck, and a sharp overhung portion is left which is visible through the neck when the latter is transparent. Such an overhung or undercut portion can be somewhat unsightly and may also serve as an undesirable area for product buildup and could conceivably obstruct or abrade the tongue of a consumer drinking directly from the container.

The reasons for such incomplete molding into the wall of the neck are several. For example, if the diameter of the wall of the parison from which the article is molded varies slightly because of surging during extrusion, the resulting diameter of the lip left in the tear area will likewise vary. If the tolerances in the neck area of one mold are slightly different from those of another or if the clamping force holding the mold or gripping jaws together varies from one installation to another, the mold lip and neck diameters can likewise be expected to vary. Also, the plastic in the joint between the neck and flash has not been found to tear to exactly the same dimensions each time, possibly due to slight variations in the temperature or content of the thermoplastic material. As a result of any one or a combination of these circumstances, when the plug member is inserted into the neck, its diameter along the length is quite critical. If it is too small in comparison with that of the lip the plastic will not be forced sufficiently outward at the end of the plug stroke, whereas if it is too large it cannot force the plastic sufficiently outward into the neck wall because the excess amount of plastic present in the area has no place to go.

SUMMARY OF THE INVENTION

Now, however, a method and means have been developed for improving the aforesaid technique for finishing hollow plastic articles, such technique being referred to herein as "hot trimming".

Accordingly it is a principal object of this invention to provide hot trimming method and apparatus improvements.

An additional object of this invention is to provide a method and apparatus for improving the smoothness of the inner surface of the neck of an article which has been finished by hot trimming.

Another object of this invention is to provide a method and apparatus for improving the tractability of hot trimming by reducing the criticality of the diameter of the plug member.

A further object of this invention is to provide method and apparatus improvements for hot trimming downstream of the forming mold.

An additional object of this invention is to provide an improved means for controlling the temperature of the plastic in the area where flash removal from the neck occurs during hot trimming.

A further object of this invention is to provide apparatus improvements using a minimum number of parts which compensate for process variables when finishing by hot trimming.

Other objects of this invention will in part be obvious and will in part appear hereinafter.

These and other objects are accomplished in finishing a blown hollow plastic article having waste flash attached to a neck portion by relatively moving the flash and article away from each other to sever the flash from the neck portion, the plastic in the area of severance being at elevated temperature, and then displacing an irregular lip left in the area of severance axially inward toward the base of the article, by providing the improvement which comprises rolling a finishing tool around the inside of the neck portion in contact with the inwardly displaced lip while exerting a radially outward force thereon to compress the lip into the wall of the neck. Preferably the finishing tool is initially concentrically inserted into the neck to accomplish inward displacement of the irregular lip and then moved eccentrically to the neck axis for rolling.

The apparatus includes means for moving the finishing tool eccentrically to the neck axis to bring its surface into forcible contact with the lip and means for rolling the eccentrically moved tool around the inside of the neck in forcible contact with the lip.

The finishing tool is preferably mounted in a tool assembly which includes an eccentric drive housing operatively connected to a shaft assembly, such drive housing having a cylindrical cavity with a helically oriented groove formed in its surface, a finishing tool housing forward of the drive housing having both a rearward extension slidable in the drive housing and a mounting shaft for the finishing tool, pin means for interconnecting the extension and drive housing having end portions situated within the groove and force means for moving the pin means and drive housing with respect to each other.

The portion of the mold defining the joint where the flash is torn away from the neck preferably includes insulating means to facilitate keeping the thermoplastic in such area at elevated temperature during molding.

BRIEF DESCRIPTION OF THE DRAWINGS

In describing the overall invention reference will be made to the accompanying drawings wherein:

FIG. 1 is an elevational, sectional view, showing the position of certain apparatus components just prior to tearing flash away from the neck of an article in the hot trimming process;

FIG. 2 is a view similar to FIG. 1 illustrating a particular embodiment of apparatus useable in the plugging step of the hot trimming process;

FIGS. 3 and 4 are elevational, schematic, views, partially in section, illustrating a preferred form of apparatus for manipulating the irregular lip left after tearing the flash away from the neck;

DETAILED DESCRIPTION OF THE ILLUSTRATED EMBODIMENTS

Figure 4:
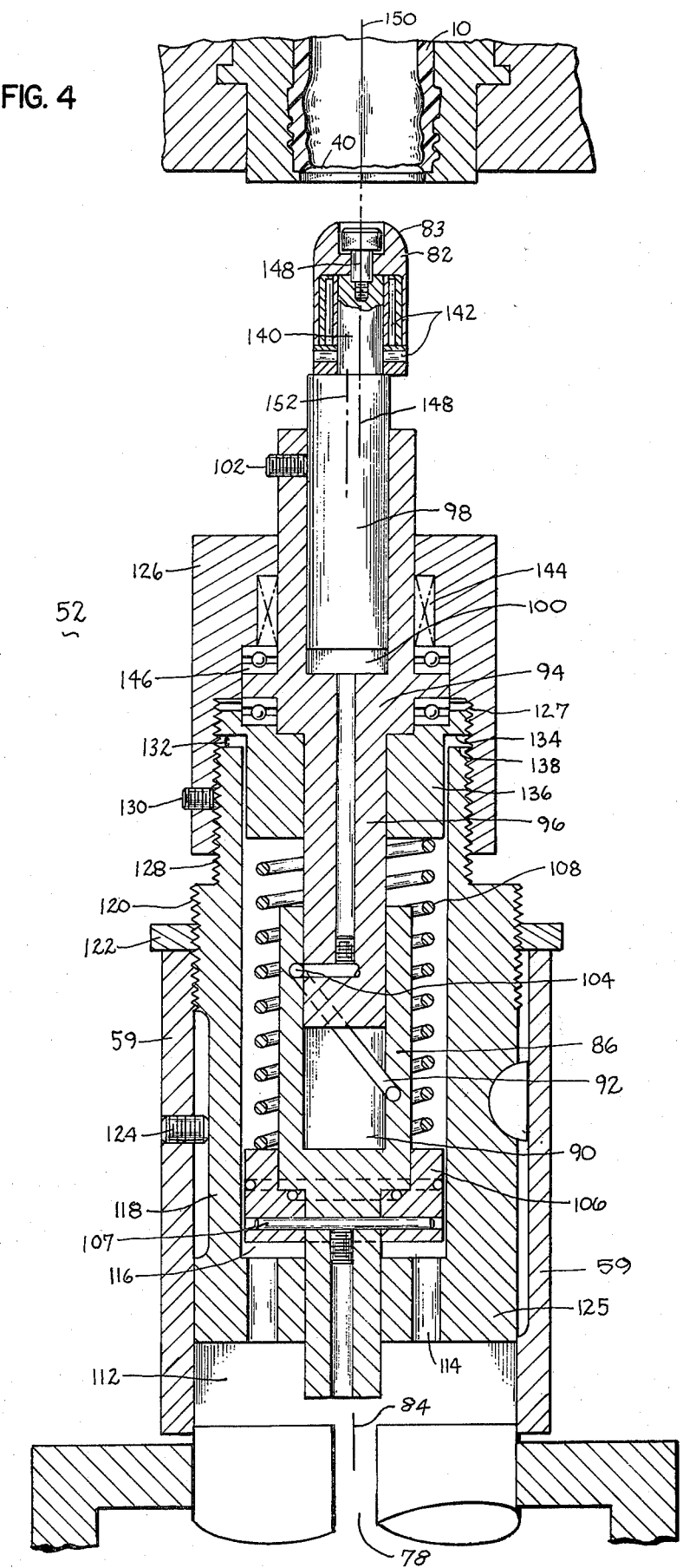
Figure 5:
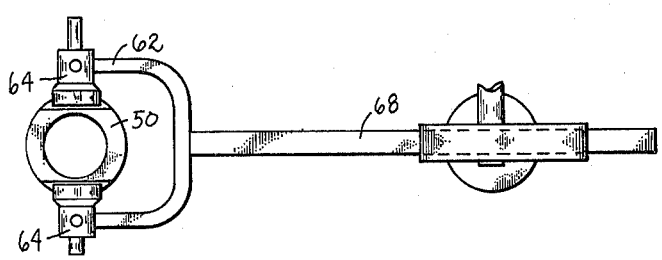
FIG. 5 is a plan view to reduced scale taken along 5–5 of FIG. 3.

Referring now to the drawings, there is illustrated in FIG. 1, a portion of the apparatus for hot trimming a hollow plastic article 10 having a cylindrical neck portion 12 with an integrally attached waste flash portion 14 which was formed concurrently with the article in a prior blow molding step. Gripping means generally indicated as 11 are provided for supporting the article around neck portion 12 and optionally around an immediately adjacent wall portion thereof. In the illustrated embodiment of FIG. 1, gripping means 12 comprise jaws 13 and 16 closeable on article 10 by a suitable actuation mechanism, not shown. Each jaw has a semi-circular projection 18 which seats within a mating step at the end of neck portion 12 when the jaws are in closed position. The temperature of relatively thick portion 20 of flash 14 for moldable thermoplastics in general is between 200° to 300°F. at this point in the process. Puller assembly 24 includes head portion 26 angularly cut away at 28 to form bifuracted end portion 30 which is inwardly beveled at 32 to match the outward flare of expanded flash portion 22. Thus, when head portion 26 is indexed in the direction of arrow 36 by suitable means, not shown, bifuracted portion 30 fits over expanded portion 22 of flash portion 14 and abuts surface 34. Optionally, gripping means 12 may be indexed to insert the flash portion within bifuracted portion 30 in the same manner. Shaft portion 38 is attached at its lower end to a suitable reciprocating means, for example an air cylinder, for abruptly moving shaft 26 downwardly to tear flash 14 away from neck 12 at thickened area 20. When this is done, pliable irregular lip 40 (FIG. 2) remains which must be manipulated and eventually wiped flat according to subsequent steps in the process. Air passage 42 connected to a suitable conventional source of pressurized air may be formed in head portion 26 opening into cutout portion 28 for expelling any wedged severed flash portion 14 from within cutout portion 28.

Turning now to FIGS. 3 and 4, there is illustrated a preferred form of apparatus for carrying out the subsequent steps of the hot trimming process. Shaft assembly 44 (FIG. 3) for mounting actuating tool assembly 52 (FIG. 4) comprises a spindle 50 which houses a series of internal bearings, not shown, for rotatably supporting spindle shaft 53 having splined portion 49.

Such a spindle is old in the art being commercially available as Whitnon Spindle Style D-194 from Heli-Coil Corp. Machine Spindle Div., Farmington, Conn. 06032. Spindle 50 is reciprocable in bracket 51 when arm means 54 oscillates in the direction of arrow 56 as a result of movement of follower 58 along the surface of separately driven cam 60. Arm means 54 includes yoke 62 pivotally connected to spindle 50 by means of shoes 64 which are slidable in slots 63 formed in opposite sides of spindle 50. An air spring comprising pressurized piston 66 continuously forces arm 68 on which follower 58 is rotatably mounted against the contoured surface of cam 60. Thus, when arm 68 is oscillated in direction 56 the fins of splined portion 49 of shaft 53 slide in closely conforming contact within opposing keyways in coupling 55 to allow shaft assembly 44 to axially shift in a vertical direction. Stud 68 abutting head 70 of bolt 71 mounted in housing 48 positively delimits upward movement of the shaft assembly. Collar 72 journaled by means of bearings 73 in the lower portion of bracket 51 has conventional coupling means such as sheave 74 with grooves 76 formed therein for power transmission belts rotatably associated with a conventional drive means such as an electric motor. Axial bore 78 extends through the full extent of shaft assembly 44 and communicates at its lower end with a suitable source of pneumatic pressure, not shown, entering through coupling 80 in rotary joint 79.

Tool assembly 52 (FIG. 4) mounted within the hollow rotating forward end 59 of spindle 50 is provided for supporting and actuating a contoured finishing tool 82 and includes means therein to move tool 82 eccentrically with respect to the axis 84 of shaft assembly 44. The diameter of finishing tool 82 is preferably less than that of irregular lip 40 by an amount equivalent to the extent to which it may be moved eccentric to the neck axis as will be described hereafter. Tool assembly 52 comprises eccentric drive housing 86 within forward end 59 of spindle 50. Housing 86 has cylindrical cavity 90.

Finishing tool housing 94 of tool assembly 52 is forward of drive housing 86 has a rearward extension 96 slidable in cavity 90 of drive housing 86, and a mounting shaft portion 98 at its forward end for rotatably supporting finishing tool 82. Though shaft portion 98 may be an integral part of housing 94, it is preferably provided separately and is rigidly seated within bore 100 by set screw 102. Pin means including cross pin 104 having opposite end portions seated within opposing helical grooves 92 passes through extension 96 and interconnects the latter with drive housing 86.

Force means for moving pin 104 and drive housing 86 with respect to each other includes piston 106 within which drive housing 86 is rigidly seated via connecting pin 107, and compression spring 108 biasing piston 106 to the rear toward shaft assembly 44. Fluid flow means are included for urging piston 106 forward in opposition to the rearward thrust of spring 108 and includes passages 114 providing open communication between cavity portion 116 of tool mounting means 118 and plenum 112 which in turn is open to axial cavity 78 of shaft assembly 44. Mounting member 118 allows adjustable positioning of tool assembly 52 on the forward end portion 59 of shaft assembly 44 by means of screw threads 120 on the outer surface thereof cooperating with opposing threads on locknut 122 rigidly secured on forward end 59. Jam nut 124 holds mounting member 118 fixed with respect to end portion 59 after the position of the tool assembly is set. Mounting member 118 comprises cylindrical housing 125 having cavity 116 formed therein within which eccentric drive housing 86 is movable.

Means are also provided for adjustably delimiting the extent of movement of eccentric drive housing 86 and pin member 104 with respect to each other, and include cap 126 having threads 127 on its inner surface for cooperating with threads 128 on the outer surface of the forward end of mounting member housing 118. A locking screw 130 secures cap 126 to such forward end after the desired axial orientation of one with respect to the other is set. Thus, by moving cap member 126 axially along threads 128 the amount of clearance illustrated by arrow 132 between surface 134 of abutment 136 and forward surface 138 of member 118 may be varied.

Finishing tool 82 is rotatably mounted on extension 140 by means of needle bearings 142. Suitable additional conventional air seals and bearings may be used in tool assembly 52 as required, such as radial and thrust bearings 144 and 146 respectively.

Figure 6:
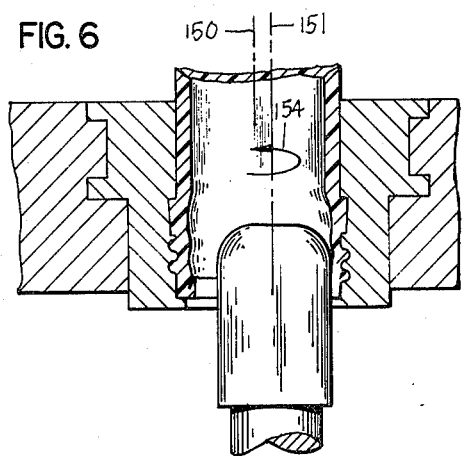
FIG. 6 is a partial, vertical sectional view of a portion of the apparatus of FIG. 4 during the final step of the hot trimming process.

In operation, after removal of the flash as previously described with respect to FIG. 1, article 10 gripped between closed jaws 13 and 16 (or sections of a closed mold) is moved opposite tool assembly 52. In the initial plugging step for axially displacing irregular pliable lip 40 inwardly toward the base of article 10, spindle axis 84, extension axis 148 and neck axis 150 are coaxial as illustrated in FIG. 4 while tool housing axis 152 is eccentric to axes 84, 148 and 150. Shaft assembly 44 including extension 59 is rotating since actuated by the drive motor operatively connected to sheave 74. Mounting member 118, cap member 126, finishing tool housing 94 and finishing tool 82 are likewise rotating as a unit. Shaft assembly 44 is then reciprocated upwardly via spline portion 49, arm means 54 and cam means 57 to drive contoured surface 83 of finishing tool 82 into the neck portion of the article to displace irregular lip 40 inwardly away from the outer open end. After this is done, air is introduced under pressure through coupling 80, axial bore 78, plenum 112, passages 114 and against piston 106 to force eccentric housing 86 forwardly with respect to pin 104, thereby causing relative movement of cross pin 104 and helical slots 92. Since finishing tool housing 94 carrying tool 82 is pinned at 104 to eccentric housing 86, tool 82 will accordingly be moved eccentric to spindle axis 84 and to neck axis 150 to new axis 151 (FIG. 6). Rotary movement of the entire assembly continues (FIG. 6) and the plastic comprising the inwardly displaced irregular lip is positively compressed outwardly and rolled or wiped substantially flat into the wall of the article as finishing tool 82 rolls around the inner surface of the neck, e.g. in the direction of arrow 154, due to the eccentric relation therebetween. Since finishing tool 82 is journaled on extension 140, it in turn separately rotates about its own axis during such rolling movement, thereby avoiding any scuffing type of contact between surface 83 and the still moldable plastic. The force holding finishing tool 82 against the inner surface of the neck accordingly is generated by the pressure of the air on the entire assembly and should be between 20 to 200 lbs., values in excess of 200 requiring unusually high jaw clamping forces, whereas values below 20 generally not being adequate to compress the partially set plastic into the wall of the neck. Also, because of the resilient manner in which tool 82 is forced against the plastic through the action of the compressible air and spring member 108, slight irregularities in the thickness of the plastic being molded into the neck are automatically accommodated. After the irregular lip has thus been wiped into the wall of the neck, the air pressure holding tool 82 in its eccentric position is released causing spring 108 to return tool 82 to coaxial alignment with axis 150 of the article neck. Shaft assembly 44 is then reciprocated downwardly and jaws 14 and 16 separated to release the finished article from the apparatus.

Though finishing tool surface 83 can alternatively already be positioned eccentric to the neck when inserted therein, it is preferred that the tool be inserted concentrically and then caused to move eccentrically after it has entered. It should likewise be realized that it may be unnecessary to move the entire tool 82 eccentrically to the neck to accomplish the wiping action, and that a tilting movement of tool 82 to bring only a portion of it into eccentric position may likewise be functionally adequate.

Alternatively, it may be desirable to perform the plugging operation or inward displacement of the plastic in a separate step upstream of the just described eccentric lip rolling movement, yet downstream, however, of the flash removal portion of the process described with respect to FIG. 1. In such instances, reciprocably mounted plug member 156 (FIG. 2) may be provided upstream of shaft assembly 44 to accomplish this, whereupon it is removed by causing piston 158 to reciprocate downwardly in housing 160 and the gripped article moved opposite the apparatus of FIGS. 3 and 4 to carry out the radial wiping step. When carrying out the process in this latter manner, plug member 156 is preferably resiliently mounted by means, for example, of compression spring 162 in order to absorb reciprocative movement of plug 156 should lip 40 retard its entry into the neck.

Figure 7:
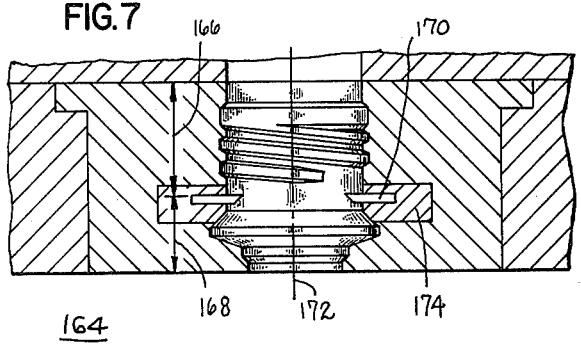
FIG. 7 is a partial, vertical, sectional view of a blow mold improvement for use in forming an article to be finished by hot trimming.

In FIG. 7 there is illustrated a blow mold generally indicated as 164 having a first cavity portion 166 defining the neck of an article to be molded therein from thermoplastic material and an adjacent second cavity portion 168 for holding the previously described waste flash attached to the neck. Projecting member 170 in the vicinity of the junction of such first and second cavity portions extends toward mold axis 172 and constitutes the previously defined step around which the plastic forms and at which point the flash is removed from attachment to the neck after molding. As a desirable feature of the invention, means such as annulus 174 made, for example, of low heat conductive phenolic cement may be provided for insulating projection 170 from the adjoining mold surfaces to facilitate keeping the thermoplastic forming around projection 170 at elevated temperature for ease of subsequent removal. It is preferable that the insulating means be confined to the portion of the mold defining the area of plastic to be torn away and that it not extend down into the neck to any appreciable extent since the plastic of the neck should be in as intimate contact as possible with the cool molding surfaces of the blow mold during molding to minimize distortion thereof when the flash is later torn away.

Figure 8:
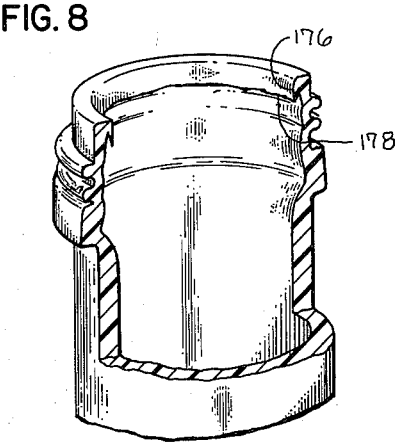
FIG. 8 is a vertical, perspective view, partially in section, of the end of a molded article finished by hot trimming prior to the present invention.
Figure 9:
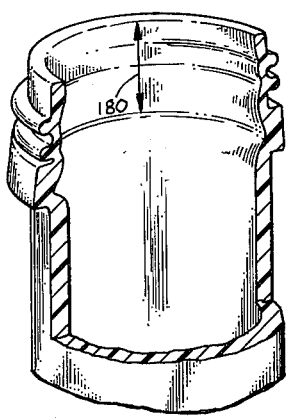
FIG. 9 is a view similar to FIG. 8 of the end of an article finished according to the present invention.

In FIG. 9 the finished neck portion of the article obtained by means of the present invention is illustrated for purposes of comparison with that of FIG. 8 which is the typical of the appearance obtained without employing the radial rolling movement of the finishing tool. Thus, in FIG. 8 there is illustrated a peripheral overhanging portion 176 having a relatively sharp edge 178 visible through the wall of the neck and resulting from inward displacement of the irregular lip without radial compression into the surrounding wall. In FIG. 9, no such undercut is visible, the inner surface of the neck being relatively smooth along portion 180 though somewhat irregular in thickness because of the variable outward displacement of the plastic during blowing and finishing. Such irregularities in thickness, however, are not considered unsatisfactory as long as the inner neck surface is relatively smooth.

Various modifications and alterations of the invention will be readily suggested to persons skilled in the art. It is intended therefore, that the foregoing be considered as exemplary only and that the scope of the invention be ascertained from the following claims.

I claim:

1. In apparatus for finishing a hollow plastic article having a neck with an integrally attached waste portion which includes means for holding the article around the neck, means for severing the waste portion from the neck, a finishing tool for cooperating with an irregular lip left after severance in the area of the prior junction of the neck with the waste portion, the improvement which comprises means for moving at least a surface portion of said finishing tool eccentrically with respect to the axis of the neck to bring said surface portion into forcible contact with the irregular lip and means for rolling said eccentrically moved finishing tool surface around the inside of the neck in forcible contact with said irregular lip.

2. The apparatus of claim 1 including rotating means to allow said finishing tool to turn about its own axis during said rolling.

3. Apparatus for finishing a hollow plastic article having a neck portion which comprises:
   a. gripping means for holding the article around the neck portion during finishing;
   b. means for severing waste flash from the neck portion;
   c. a rotatably mounted shaft assembly;
   d. a tool assembly on the end of said shaft assembly which includes a finishing tool eccentrically positioned with respect to the axis of the shaft assembly; and
   e. means to reciprocate said shaft assembly toward and away from said gripping means to move the finishing tool into and out of the neck portion.

4. The apparatus of claim 3 including means to move the finishing tool eccentrically with respect to the axis of the shaft assembly.

5. The apparatus of claim 3 which includes a reciprocably mounted plug member intermediate the means for severing the waste flash and the shaft assembly for entering the neck after severance of the flash.

6. The apparatus of claim 3 wherein said tool assembly comprises:
   a. an eccentric drive housing operatively connected to the shaft assembly having a cylindrical cavity with a helically oriented groove formed in the surface thereof;
   b. a finishing tool housing forward of said drive housing having a rearward extension slidable in said drive housing and a mounting shaft for said finishing tool;
   c. pin means interconnecting said extension and drive housing, said pin means having end portions within said groove; and
   d. force means for moving said pin means and drive housing with respect to each other.

7. The apparatus of claim 6 wherein said force means includes
   a. a piston abutting said eccentric drive housing;
   b. spring means biasing said piston toward the shaft assembly; and
   c. fluid flow means for urging the piston in opposition to the spring means.

8. The apparatus of claim 6 including means for adjustably delimiting movement of the drive housing and pin means.

9. The apparatus of claim 3 wherein said means for reciprocating the shaft assembly includes:
   a. a splined shaft section of said assembly;
   b. arm means; and
   c. cam means operatively connected to the arm means for arcuately oscillating said arm means to reciprocably move fin portions of said splined shaft in associated mating depressions of the shaft assembly.

10. The apparatus of claim 6 including mounting means for adjustably positioning the tool assembly on the end of the shaft assembly, said mounting means including a cylindrical housing having a cavity formed therein for receiving the eccentric drive housing and having threads on its outer surface for cooperating with threads on the shaft assembly.

11. Apparatus for finishing a hollow plastic article having a neck portion which comprises:
   A. gripping means for holding the article around the neck portion during finishing;
   B. means for severing waste flash from the neck portion;
   C. a rotatably and reciprocably mounted shaft assembly;
   D. a tool assembly on the end of said shaft assembly, said tool assembly comprising:
      a. an eccentric drive housing operatively connected to the shaft assembly having a cylindrical cavity with a helically oriented groove formed in the surface thereof;
      b. a finishing tool housing forward of said drive housing having a rearward extension slidable in said drive housing and a mounting shaft rotatably supporting a finishing tool on the forward end thereof;

c. pin means interconnecting said extension and drive housing, said pin means having end portions within said groove;
d. force means for moving said pin means and drive housing with respect to each other; and
e. means for adjustably delimiting movement of the drive housing and pin means with respect to each other.

E. means to reciprocate said shaft assembly toward and away from said gripping means to move the finishing tool into and out of the neck portion; and
F. means for rotating said shaft assembly.

* * * * *